United States Patent
Karube

(10) Patent No.: US 12,456,285 B2
(45) Date of Patent: Oct. 28, 2025

(54) LEARNING MODEL GENERATING METHOD AND INSPECTION DEVICE

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 405 days.

(21) Appl. No.: 18/191,269

(22) Filed: Mar. 28, 2023

(65) Prior Publication Data

US 2023/0316718 A1 Oct. 5, 2023

(30) Foreign Application Priority Data

Mar. 30, 2022 (JP) .................. 2022-056485

(51) Int. Cl.
G06V 10/764 (2022.01)
G06T 7/00 (2017.01)
G06V 10/82 (2022.01)

(52) U.S. Cl.
CPC .......... *G06V 10/764* (2022.01); *G06T 7/0004* (2013.01); *G06V 10/82* (2022.01)

(58) Field of Classification Search
None
See application file for complete search history.

(56) References Cited

U.S. PATENT DOCUMENTS

| 2018/0314917 A1* | 11/2018 | Mehr | G06F 30/00 |
| 2022/0076053 A1* | 3/2022 | Gulsun | G06N 3/045 |
| 2023/0367306 A1* | 11/2023 | Chang | G06N 3/0455 |

FOREIGN PATENT DOCUMENTS

JP 2010-204966 A 9/2010

\* cited by examiner

*Primary Examiner* — Leon Flores
(74) *Attorney, Agent, or Firm* — Carter, DeLuca & Farrell LLP

(57) ABSTRACT

An autoencoder is caused to learn based on data of a majority class of imbalanced data. The imbalanced data is input to the autoencoder that has learned, and an error in a predetermined parameter between an input image data and an output image data is acquired. Data of each class is extracted as teacher data such that the number of pieces of first class data counted in descending order of the size of the obtained error among the first class data and the number of pieces of second class data are balanced. A convolutional neural network is caused to learn the teacher data to obtain a learning model.

7 Claims, 7 Drawing Sheets

CASE 1: WHEN NUMBER OF PIECES OF D1 IS LARGER
THAN NUMBER OF PIECES OF D2 IN OVERLAPPING REGION

CASE 3: WHEN THERE IS NO OVERLAPPING REGION

LEARNING MODEL GENERATING METHOD AND INSPECTION DEVICE

BACKGROUND

Technical Field

The present invention relates to a learning model generating method in machine learning and an inspection device using the learning data.

Related Art

In image classification by machine learning based on a neural network, an identifier is caused to learn using a teacher image whose classification label is known. In the learning of the identifier, a method is used that causes an identifier having a convolutional neural network (CNN) to learn a result learned by a variational autoencoder (VAE). The classification label can be estimated by inputting an image to be inspected to the identifier that has learned.

In an image inspection method based on the neural network, a feature of the image more suitable for the inspection can be obtained by preparing a large number of images of a normal product and an abnormal product related to the inspection target and causing the neural network to learn these images. This can significantly save the design of the feature. In addition, in a case where normality or abnormality of a product manufactured by a manufacturing device is identified, it is conceivable to detect the abnormal product by using the above-described identifier.

In general, manufacturing devices that manufacture products to be inspected are designed to manufacture many normal products and not to manufacture abnormal products as much as possible. Most of the products manufactured in this situation are normal products (good products), and only a small number of abnormal products (defective products) are obtained as compared with normal products. As a result, as images for learning by the neural network, a large number of images of normal products can be obtained, while only a small number of images of abnormal products are obtained. This causes teacher data for learning to be imbalanced data including many pieces of image data labeled as a normal product and a few pieces of image data labeled as an abnormal product.

As described above, if learning of the identifier is performed using the imbalanced data in which the number in labeled classes included in the data set to be inspected is biased, the rate of determination as a normal product increases. Thus, even if a large amount of images to be inspected is prepared, it is difficult to strictly determine the abnormal product when the training data for learning is imbalanced data.

To address this issue, in JP 2010-204966 A, the number of pieces of data is adjusted between the classes of the teacher data such that the class determination result by supervised learning is not biased to a specific class in the case where the number of classes included in the teacher data is plural. Specifically, when it is determined that there is a bias in the number of pieces of data between the classes of the teacher data, the number of pieces of data is equalized between the classes by increasing or decreasing the number of pieces of data of a certain class.

SUMMARY

However, there is the following problem in the field of abnormality detection even in a case where the number of pieces of data of the class of a normal product and the number of pieces of data of the class of an abnormal product are simply equalized by decreasing the number of pieces of image data of the normal product to generate a learning model, and an identifier is created from the learning model. That is, although it is expected that the classifier will increase the rate of abnormality detection, this will not result in the improvement in the accuracy of abnormality detection. This is attributed to the fact that an image suitable for discriminating between the image data of the normal product and the image data of the abnormal product is not necessarily obtained by simply equalizing only the number of pieces of data of each class.

An object of the present invention is to generate a learning model capable of accurately identifying each class even in a case where data having two classes and serving as a source of learning is imbalanced data.

In order to achieve this object, an invention according to claim 1 is a learning model generating method for generating a learning model to be used for a convolutional neural network that determines which one of two classes, a first class ("normal image class C1" in the present embodiment (the same applies hereinafter)) and a second class (abnormal image class C2) having a smaller number of pieces of data than the number of pieces of data of the first class an inspection target belongs to, the learning model generating method including: a first learning step of causing an autoencoder (variational autoencoder) to learn using a plurality of pieces of first class data until first class data (normal image data D1) can be reconstructed; an error acquisition step of inputting imbalanced data including the plurality of pieces of first class data and a plurality of pieces of second class data (abnormal image data D2) to the autoencoder as input image data, obtaining respective output image data, and acquiring an error in a predetermined parameter between the input image data and the output image data; an extraction step of extracting the first class data and the second class data to obtain teacher data such that the number of pieces of the first class data counted in descending order of the size of the obtained error among the first class data and the number of pieces of the second class data are balanced; and a second learning step of causing the convolutional neural network to learn the teacher data to obtain a learning model.

As described above, first, the input image data and the output image data of the autoencoder are considered, and an error in the predetermined parameter between the input image data and the output image data is acquired. Then, data of each class is extracted such that the number of pieces of first class data counted in descending order of the size of the obtained error among the first class data and the number of pieces of second class data are balanced. Thus, balanced data based on the predetermined parameter is obtained from the imbalanced data. As a result, it is possible to generate a learning model capable of accurately identifying each class even in a case where data serving as a source of learning is imbalanced data.

An invention according to claim 2 is the learning model generating method according to claim 1, wherein in the extraction step, the first class data is randomly extracted from between a maximum value of the error in the first class data and a minimum value of the error in the second class data in the predetermined parameter when the maximum value is larger than the minimum value.

Thus, when the maximum value of the error in the first class data is larger than the minimum value of the error in the second class data, the error of the group of the first class data and the error of the group of the second class data at least overlap each other in the predetermined parameter. In this case, it is possible to uniformly extract the first class data in the overlapping region and use the extracted data for learning by randomly extracting the first class data in the overlapping region. Thus, learning data effective for identification can be obtained.

An invention according to claim 3 is the learning model generating method according to claim 1, wherein in the extraction step, extraction is performed such that the number of pieces of the first class data and the number of pieces of the second class data are the same.

Thus, the number of pieces of first class data and the number of pieces of second class data can be reliably balanced by performing extraction such that the number of pieces of first class data is the same as the number of pieces of second class data.

An invention according to claim 4 is the learning model generating method according to claim 1, wherein in the extraction step, the total number of pieces of the second class data are extracted.

Thus, it is possible to effectively grasp the feature of a minority class by extracting all the second class data that is data of the minority class and effectively using the data for identification.

An invention according to claim 5 is the learning model generating method according to claim 1, wherein the first class data is normal image data (D1), and the second class data is abnormal image data (D2).

Thus, it is possible to identify a normal product and an abnormal product by constructing the learning model using the first class data as the normal image data and the second class data as the abnormal image data.

An invention according to claim 6 is the learning model generating method according to claim 1, wherein the predetermined parameter is a luminance value.

Thus, it is possible to more accurately identify each class by setting the luminance value as the predetermined parameter, in a case where the first class data and the second class data are classified by the luminance.

An invention according to claim 7 is an inspection device (1) including: an imaging unit (12) that images an inspection target and generates image data; an identification unit (20C) that has a convolutional neural network that determines which of two classes the image data belongs to; and an output unit (16) that outputs a determination result by the identification unit, wherein the convolutional neural network is caused to learn by the learning model generating method according to claim 1.

Thus, when the convolutional neural network is caused to learn the learning model obtained by the learning model generating method described above and the convolutional neural network is used in the identification unit of the inspection device, the inspection device can accurately identify whether the image data to be inspected belongs to the first class or the second class.

DETAILED DESCRIPTION

Hereinafter, in the present embodiment, an inspection device 1 using a learning model obtained by a learning model generating method of machine learning will be described in detail with reference to the drawings. In the inspection device 1 according to the present embodiment, a device that performs an inspection to identify a normal product and an abnormal product is taken as an example of a device that performs an inspection to identify two classes. For this reason, hereinafter, a first class is described as a normal image class C1, a second class is described as an abnormal image class C2, first class data is described as normal image data D1, and second class data is described as abnormal image data D2. The normal image data D1 is classified into the normal image class C1, and the abnormal image data D2 is classified into the abnormal image class C2. In the following description, VAE is used as an abbreviation for variational autoencoder as necessary. In addition, CNN is used as an abbreviation for convolution neural network.

Figure 1:
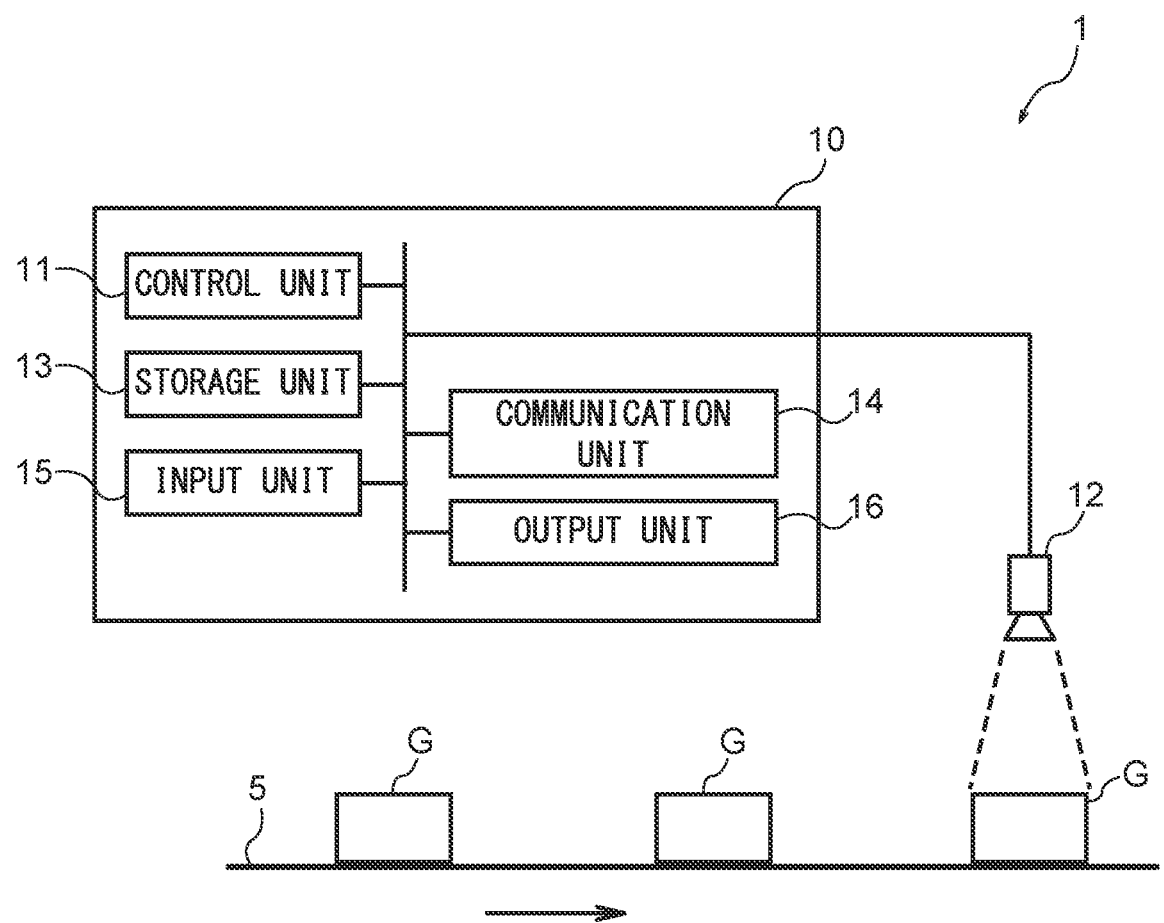
FIG. 1 is a schematic diagram illustrating a hardware configuration of an inspection device.

FIG. 1 is a schematic diagram illustrating a hardware configuration of the inspection device 1. As illustrated in FIG. 1, the inspection device 1 of the present embodiment inspects an inspection product G to be inspected, which is conveyed on a conveyor 5. The inspection device 1 inspects the inspection product G, and inspects whether the inspection product G is a normal product (good product) satisfying a predetermined quality or an abnormal product (defective product) not satisfying the predetermined quality. The inspection device 1 includes a control unit 11, an imaging unit 12, a storage unit 13, a communication unit 14, an input unit 15, an output unit 16, and the like. These units may be arranged in an information processing device 10 such as a computer or may be configured to be communicable, and are connected by a communication line or wirelessly so as to exchange information with each other.

The control unit 11 has a central processing unit (CPU) and controls operation of each unit of the inspection device 1. The control by the control unit 11 is performed by executing a program stored in the storage unit 13 or a main storage unit (not illustrated) in the control unit 11.

The imaging unit 12 includes a camera or the like. In the present embodiment, the inspection product G conveyed by the conveyor 5 is imaged, and the obtained image data is transmitted to the information processing device 10. Note that, although FIG. 1 illustrates the example in which one camera is arranged, the present invention is not limited thereto and may be configured such that a plurality of cameras are arranged and the inspection product G is imaged from a plurality of angles.

The storage unit 13 is a general device performing storage including a random access memory (RAM) and a read only memory (ROM). In addition to a program executed by the control unit 11 and the image data acquired by the imaging unit 12, data necessary for the inspection in the inspection device 1 such as data learned by a neural network is stored in the storage unit 13. Note that, although FIG. 1 illustrates the example in which the storage unit 13 is arranged inside the information processing device 10, the present invention is not limited thereto, and the storage unit 13 may be partially or entirely arranged outside the information processing device 10 and may be communicable with the information processing device 10 via the Internet.

The communication unit 14 is a mean that communicates between the information processing device 10 and an external device. In a case where the imaging unit 12, the storage unit 13, the input unit 15, the output unit 16, and the like are located outside the information processing device 10, the communication unit 14 communicates with the control unit 11 in the information processing device 10 using a well-known technique such as a wireless communication line.

The input unit 15 is a unit by which a user or the like of the inspection device 1 inputs data to the information processing device 10, and includes a keyboard, a mouse, and the like. The user can input data related to learning, an instruction to the control unit 11, and the like from the input unit 15.

The output unit 16 is a means that outputs information regarding the inspection, and is a general means that outputs information in the information processing device 10, such as an image display means such as a display, an audio output means such as a speaker, or an output terminal that outputs data. The output unit 16 can indicate an inspection status to the user by not only outputting a determination result in the inspection device 1 but also displaying information regarding the inspection.

Figure 2:
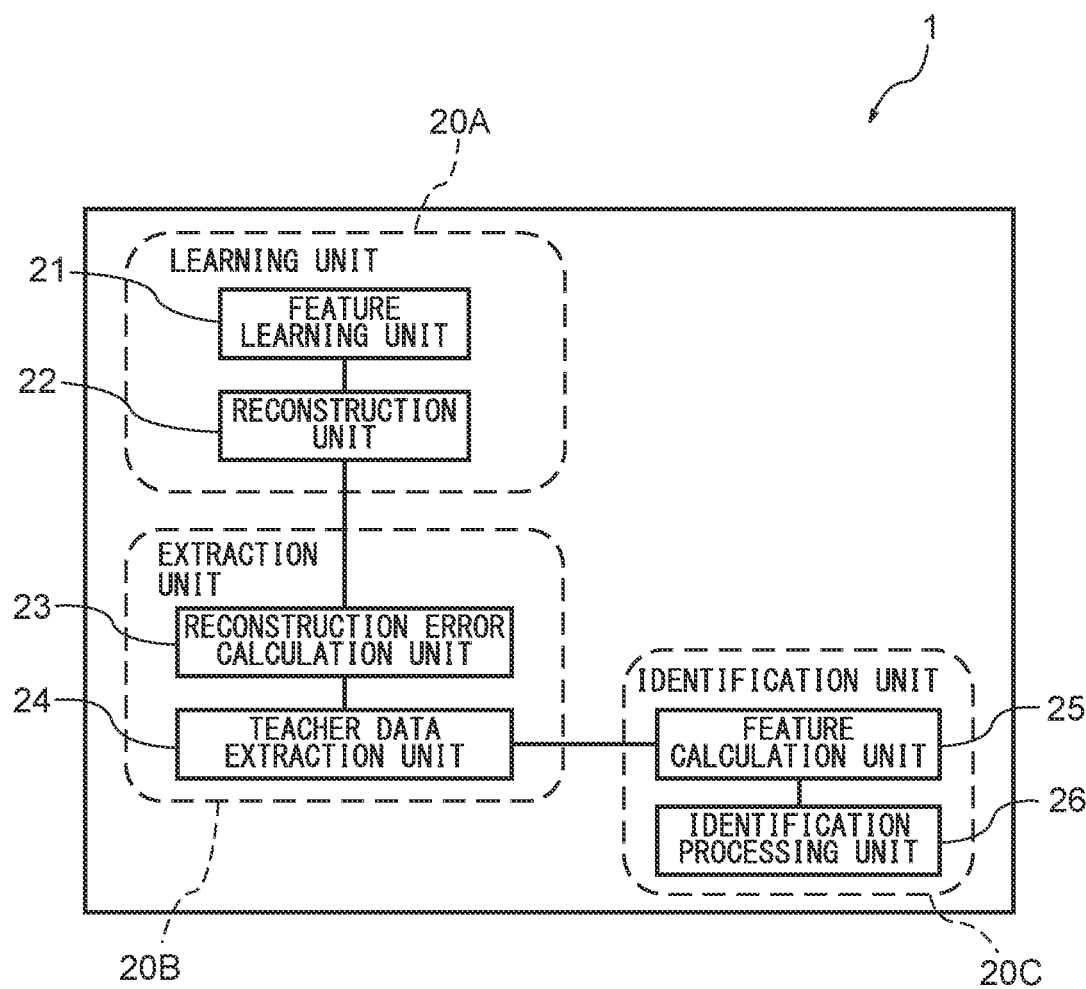
FIG. 2 is a block diagram illustrating a software configuration of the inspection device.

FIG. 2 is a block diagram illustrating a software configuration of the inspection device 1. Software of the inspection device 1 includes a learning unit 20A that performs machine learning, an extraction unit 20B that analyzes data obtained from learning in the learning unit 20A and extracts appropriate data for identification, and an identification unit 20C that performs identification using an extraction result in the extraction unit 20B.

The learning unit 20A has an autoencoder, and performs learning by the autoencoder. In the present embodiment, an example in which a variational autoencoder (VAE) is used as the learning unit 20A will be described. The learning unit 20A includes a feature learning unit 21 and a reconstruction unit 22.

The feature learning unit 21 learns a feature in the process of generating output image data similar to input image data in the VAE. In the present embodiment, the feature learning unit 21 inputs the normal image data D1 to the VAE as the input image data and generates output image data similar to the normal image data D1. In this process, the VAE learns the feature.

The reconstruction unit 22 reconstructs the input image data using the feature learned by the feature learning unit 21. Specifically, the reconstruction unit 22 generates the output image data by compressing the input image data with an encoder to obtain a latent variable, and then reconstructing the latent variable with a decoder. In the present embodiment, each of the normal image data D1 and the abnormal image data D2 is input to the reconstruction unit 22 as the input image data and the output image data is generated. Note that the input image data input to the reconstruction unit 22 is imbalanced data, and the number of pieces of normal image data D1 that is majority data is overwhelmingly larger than the number of pieces of abnormal image data D2 that is minority data.

The extraction unit 20B performs an analysis using the input image data and the output image data used in the reconstruction process of the reconstruction unit 22 based on a predetermined parameter, and extracts teacher data to be used in the identification unit 20C. This extraction step is performed such that the imbalanced data becomes balanced data. The extraction unit 20B includes a reconstruction error calculation unit 23 and a teacher data extraction unit 24.

The reconstruction error calculation unit 23 compares the input image data and the output image data in the reconstruction unit 22 based on the predetermined parameter, and calculates an error when the output image data is reconstructed from the input image data (hereinafter, this error is referred to as a "reconstruction error"). Examples of the predetermined parameter include, but are not limited to, a luminance value. In addition, the method of calculating the reconstruction error can be performed using, for example, a least square error, but is not limited thereto.

The teacher data extraction unit 24 studies the reconstruction error calculated by the reconstruction error calculation unit 23 while classifying the reconstruction error into the one in which the input image data is the normal image class C1 and the one in which the input image data is the abnormal image class C2. As a result of the study, image data to be used as teacher data in the identification unit 20C is extracted such that the imbalanced data becomes balanced data. A specific method of the study and characteristics of data to be extracted will be described in detail later.

Note that the functions of the learning unit 20A and the extraction unit 20B can also be implemented using a VAE identifier. The VAE identifier reconstructs the output image data from the input image data using the VAE, and calculates the reconstruction error. The reconstruction error is calculated as the square mean value of differences between the input and the output. The VAE is caused to learn only the normal image data to reduce the reconstruction error. The VAE identifier that has learned in this manner calculates the reconstruction error when image data related to the inspection target is input, and identifies that the inspection target is a normal product when the reconstruction error is smaller than a predetermined value.

The identification unit 20C uses the result of the teacher data extraction unit 24 to identify which class of the two classes an image related to the inspection target belongs to. The identification unit 20C includes a feature calculation unit 25 and an identification processing unit 26.

The feature calculation unit 25 calculates the feature by causing a convolutional neural network (CNN) to learn the balanced data extracted by the teacher data extraction unit 24.

The identification processing unit 26 identifies whether the image related to the inspection target belongs to the normal image class C1 or the abnormal image class C2, using the feature calculated by the feature calculation unit 25 and under the control by the control unit 11 of the inspection device 1.

Figure 3:
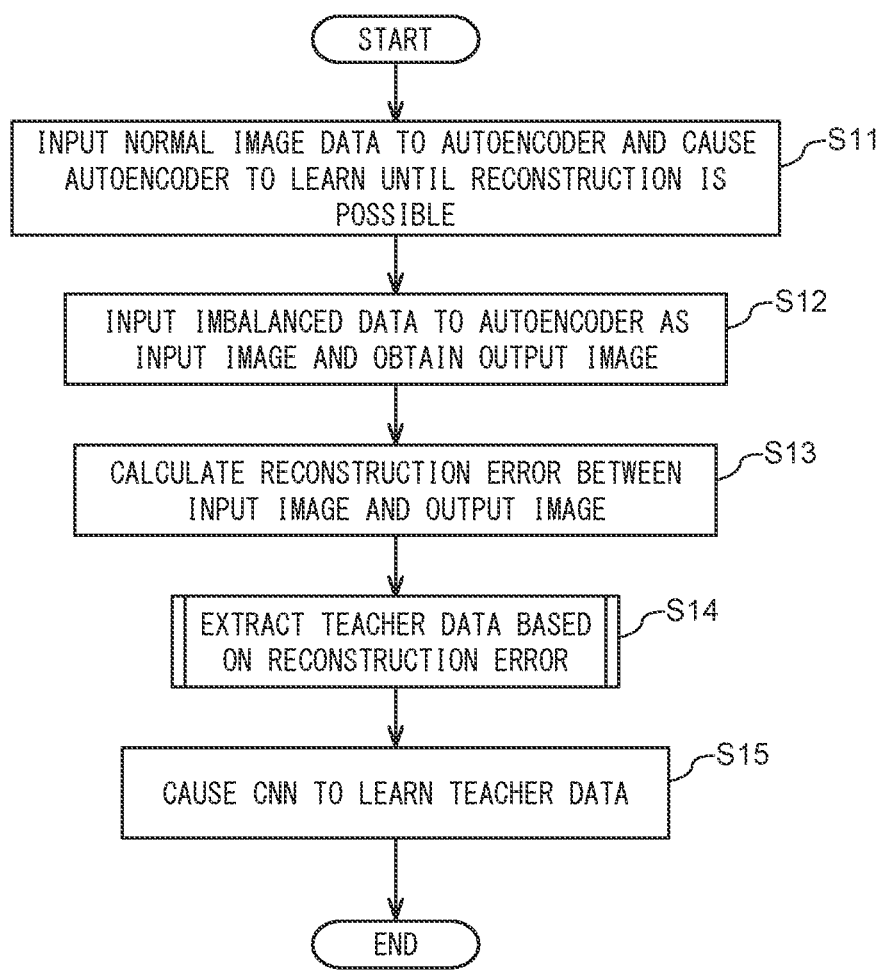
FIG. 3 is a flowchart illustrating a procedure of a learning model generating method.

FIG. 3 is a flowchart illustrating a procedure of the learning model generating method. The processing illustrated in the flowchart of FIG. 3 is executed by the CPU of the control unit 11 while developing a program stored in the ROM of the storage unit 13 in the RAM or the like, for example.

In step S11, a plurality of pieces of normal image data D1 are input to the VAE until the normal image data D1 can be reconstructed to cause the VAE to learn the feature. Here, learning until the normal image data D1 can be reconstructed means learning until the reconstruction error becomes a minimum. Step S11 is defined as a first learning step. Through the first learning step, the VAE can generate image data similar to the input image data when the normal image data is input.

In step S12, imbalanced data including a plurality of pieces of normal image data D1 and a plurality of pieces of abnormal image data D2 are input to the VAE as input image data to obtain output image data for each data. The input image data in step S12 is imbalanced data in which the normal image data D1 is majority data and the abnormal image data D2 is minority data. That is, if the number of pieces of normal image data D1 to be input is NN and the number of pieces of abnormal image data D2 to be input is NE, a relationship in which NN is overwhelmingly larger than NE (NN>NE) is established.

In step S13, the reconstruction error in a predetermined parameter between the input image data and the output image data is acquired. The predetermined parameter in the present embodiment is a luminance value of each of the image data. Steps S12 and S13 are defined as an error acquisition step. Through the error acquisition step, NN reconstruction error values using the normal image data D1 as an input and NE reconstruction error values using the abnormal image data D2 as an input are obtained. Here, NN+NE pieces of data are compared based on the reconstruction error. The data comparison method based on the reconstruction error will be described later in detail with reference to graphs (see FIGS. 4 to 6).

In step S14, the number of pieces of normal image data D1 and the number of pieces of abnormal image data D2 are extracted such that the number of pieces of normal image data D1 and the number of pieces of abnormal image data D2 are balanced. Step S14 is defined as an extraction step. The data extracted in the extraction step is used as teacher data for identification. Extraction in the extraction step is performed based on a position where the reconstruction error of the normal image data D1 is close to that of the abnormal image data D2. For example, the extraction is performed based on an overlapping region of the reconstruction errors between the normal image data D1 and the abnormal image data D2 and a boundary of the reconstruction errors. A more specific extraction method will be described in detail later. The teacher data extracted in the extraction step of the present embodiment is not merely obtained as balanced data. That is, in the extraction step of the present embodiment, the balanced data is extracted based on a position where the reconstruction error of the normal image data D1 based on the predetermined parameter is close to that of the abnormal image data D2. This makes the obtained balanced data teacher data that can more strictly identify the normal image and the abnormal image.

When the number of pieces of normal image data D1 and the number of pieces of abnormal image data D2 are balanced, it means that one of the number of pieces of normal image data D1 and the number of pieces of abnormal image data D2 is not biased. For example, in the present embodiment, the number of pieces of normal image data D1 may be the same as NE, which is the total number of pieces of abnormal image data D2, but the present invention is not limited thereto. That is, when considered as the number of pieces of teacher data, the number of normal image data D1 and the number of abnormal image data D2 do not necessarily have to be the same as long as one of the number of pieces of normal image data D1 and the number of pieces of abnormal image data D2 is not biased. In addition, the total number of pieces of minority data does not necessarily have to be used as a reference of the number of pieces of data to be extracted, and a part of the minority data may be used as the reference of the number of pieces of data to be extracted.

In step S15, the learning model to be used for identification is obtained by causing the convolutional neural network (CNN) of the identification unit 20C to learn the teacher data extracted in the extraction step. Step S15 is defined as a second learning step. Through the second learning step, the identification unit 20C can calculate a feature necessary and effective for identification.

Next, a specific method of extracting the balanced data in the extraction step after the error acquisition step will be described on a case-by-case basis using the examples of FIGS. 4 to 6. The reconstruction error of the normal image data D1 tends to be smaller than the reconstruction error of the abnormal image data D2. In the present embodiment, after the reconstruction error of the imbalanced data is acquired in the error acquisition step, the relationship between the reconstruction error of the normal image data D1 and the reconstruction error of the abnormal image data D2 is divided into the following cases 1 to 3.

Figure 4:
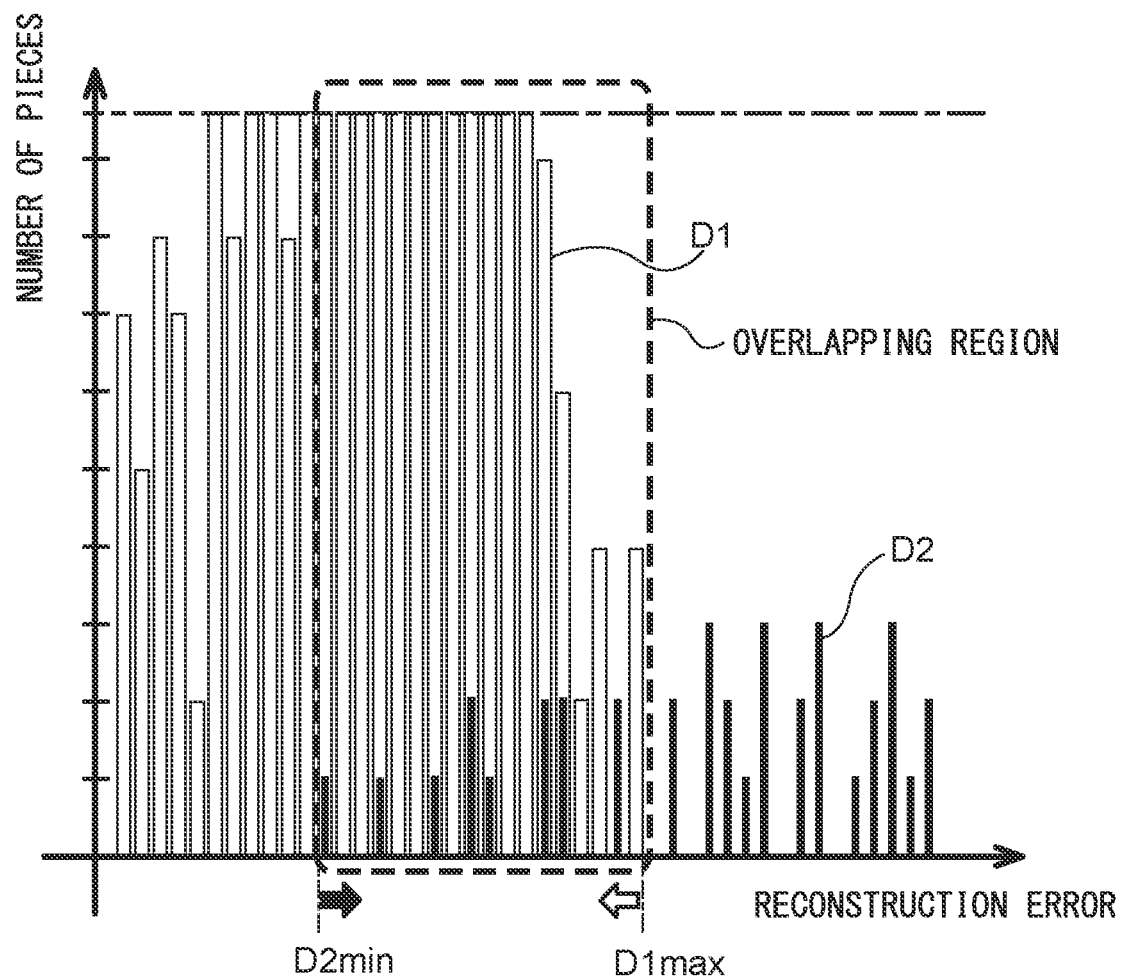
FIG. 4 is an explanatory diagram regarding extraction of balanced data (case 1)

FIG. 4 is an explanatory diagram regarding extraction of balanced data (case 1). The case 1 is a case where the maximum value (D1max) of the reconstruction error of the normal image data D1 is larger than the minimum value (D2min) of the reconstruction error of the abnormal image data D2, and the number of pieces of normal image data D1 is larger than the number of pieces of abnormal image data D2 in an overlapping region. Here, the overlapping region is a region smaller than D1max and larger than D2min, and in this region, a group of reconstruction errors related to the normal image data D1 and a group of reconstruction errors related to the abnormal image data D2 overlap each other.

When the reconstruction error such as in the case 1 is obtained, NE pieces, which is the total number, of abnormal image data D2, which is minority data, are extracted as the teacher data in the extraction step. On the other hand, NE pieces of normal image data D1 that is majority data are randomly extracted from the overlapping region and used as the teacher data.

Figure 5:
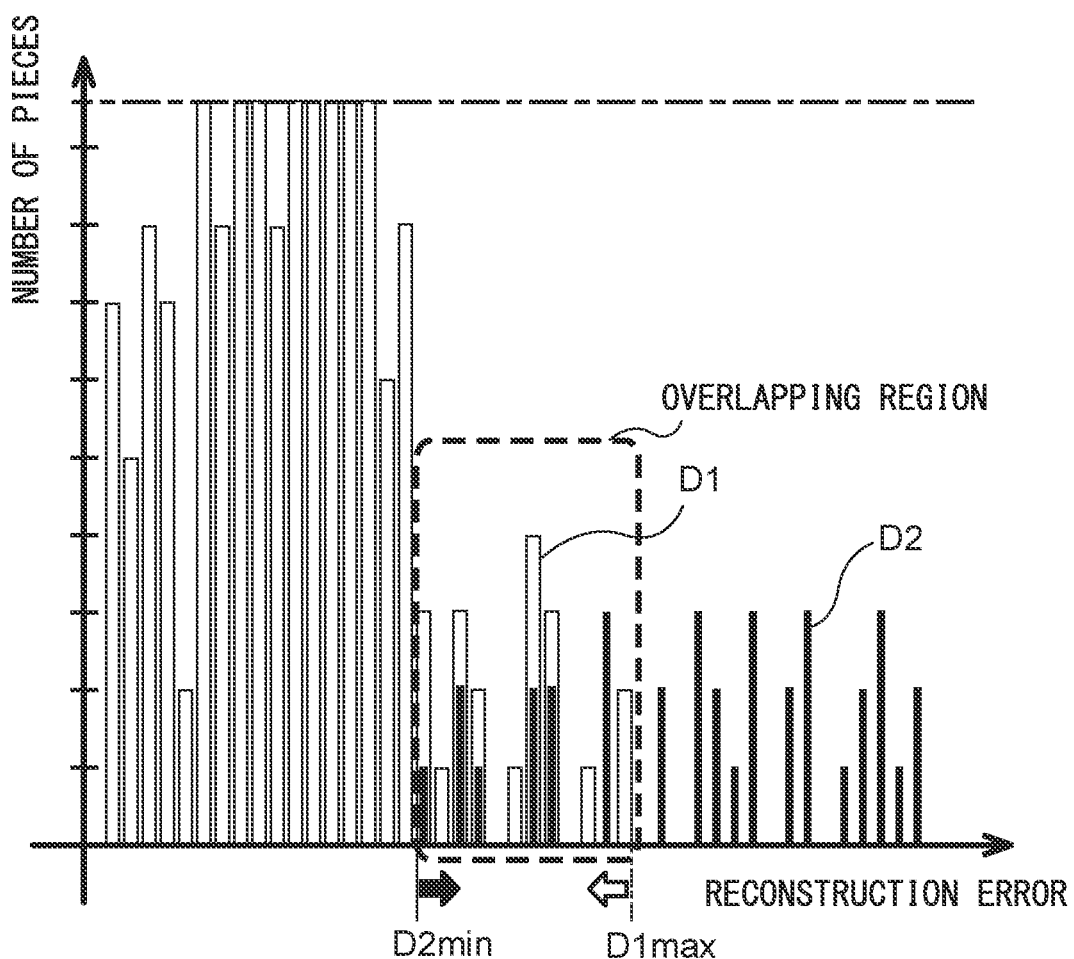
FIG. 5 is an explanatory diagram regarding extraction of balanced data (case 2)

FIG. 5 is an explanatory diagram regarding extraction of balanced data (case 2). The case 2 is a case where the maximum value (D1max) of the reconstruction error of the normal image data D1 is larger than the minimum value (D2min) of the reconstruction error of the abnormal image data D2, and the number of pieces of normal image data D1 is smaller than the number of pieces of abnormal image data D2 in the overlapping region.

When the reconstruction error such as in the case 2 is obtained, NE pieces, which is the total number, of abnormal image data D2, which is minority data, are extracted as the teacher data in the extraction step. On the other hand, the number of pieces of normal image data D1 that is majority data is less than NE even if all the pieces in the overlapping region are extracted in the extraction step. Therefore, the normal image data D1 corresponding to the shortfall is extracted in descending order of the size of the obtained reconstruction error among the normal image data D1 in a region other than the overlapping region until the number of pieces reaches NE. As a result, the teacher data is extracted.

Figure 6:
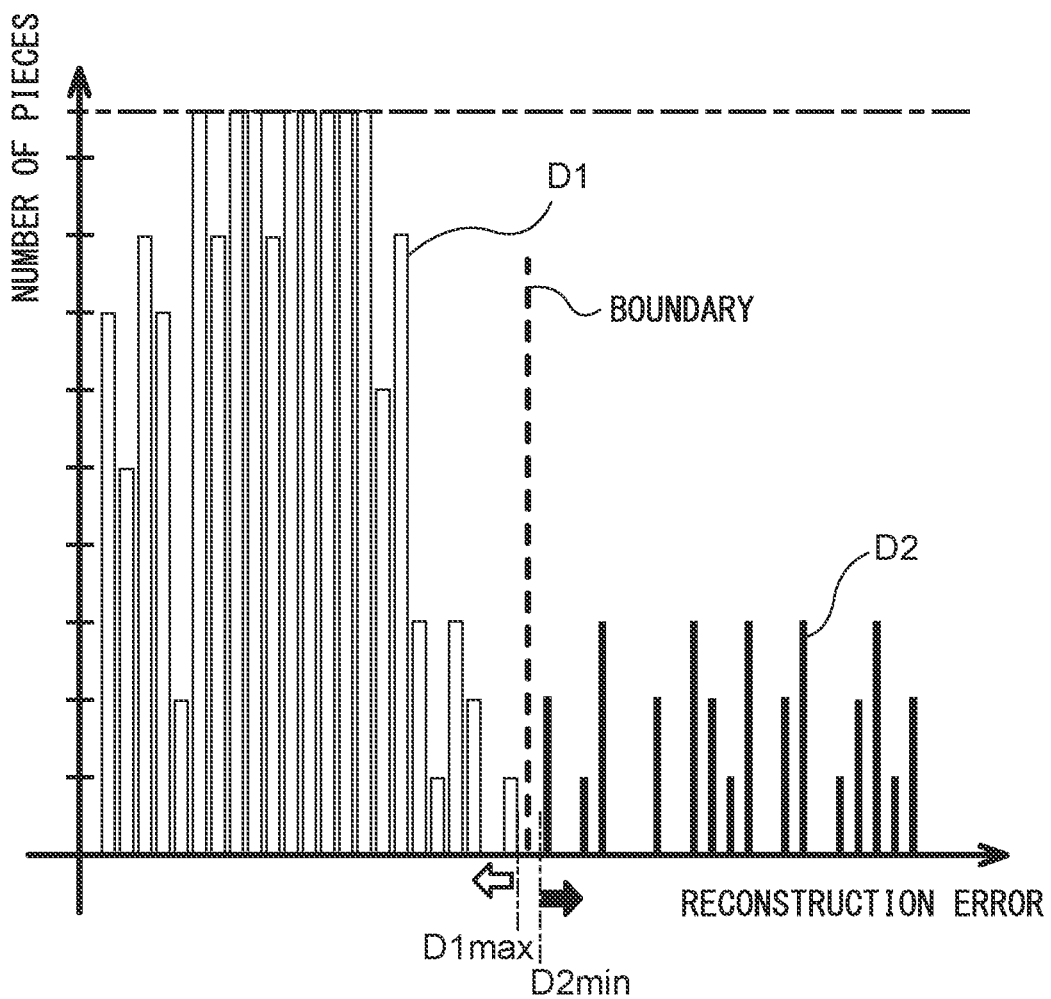
FIG. 6 is an explanatory diagram regarding extraction of balanced data (case 3)

FIG. 6 is an explanatory diagram regarding extraction of balanced data (case 3). The case 3 is a case where the maximum value (D1max) of the reconstruction error of the normal image data D1 is equal to or less than the minimum value (D2min) of the reconstruction error of the abnormal image data D2. In this case, there is no overlapping region, and a boundary is conceived between the group of the normal image data D1 and the group of the abnormal image data D2.

When the reconstruction error such as in the case 3 is obtained, NE pieces, which is the total number, of abnormal image data D2, which is minority data, are extracted as the teacher data in the extraction step. On the other hand, in the extraction step, the normal image data D1 that is majority data is extracted in descending order of the size of the obtained reconstruction error among the normal image data D1 in a region other than the overlapping region until the number of pieces reaches NE. As a result, the teacher data is extracted.

Figure 7:
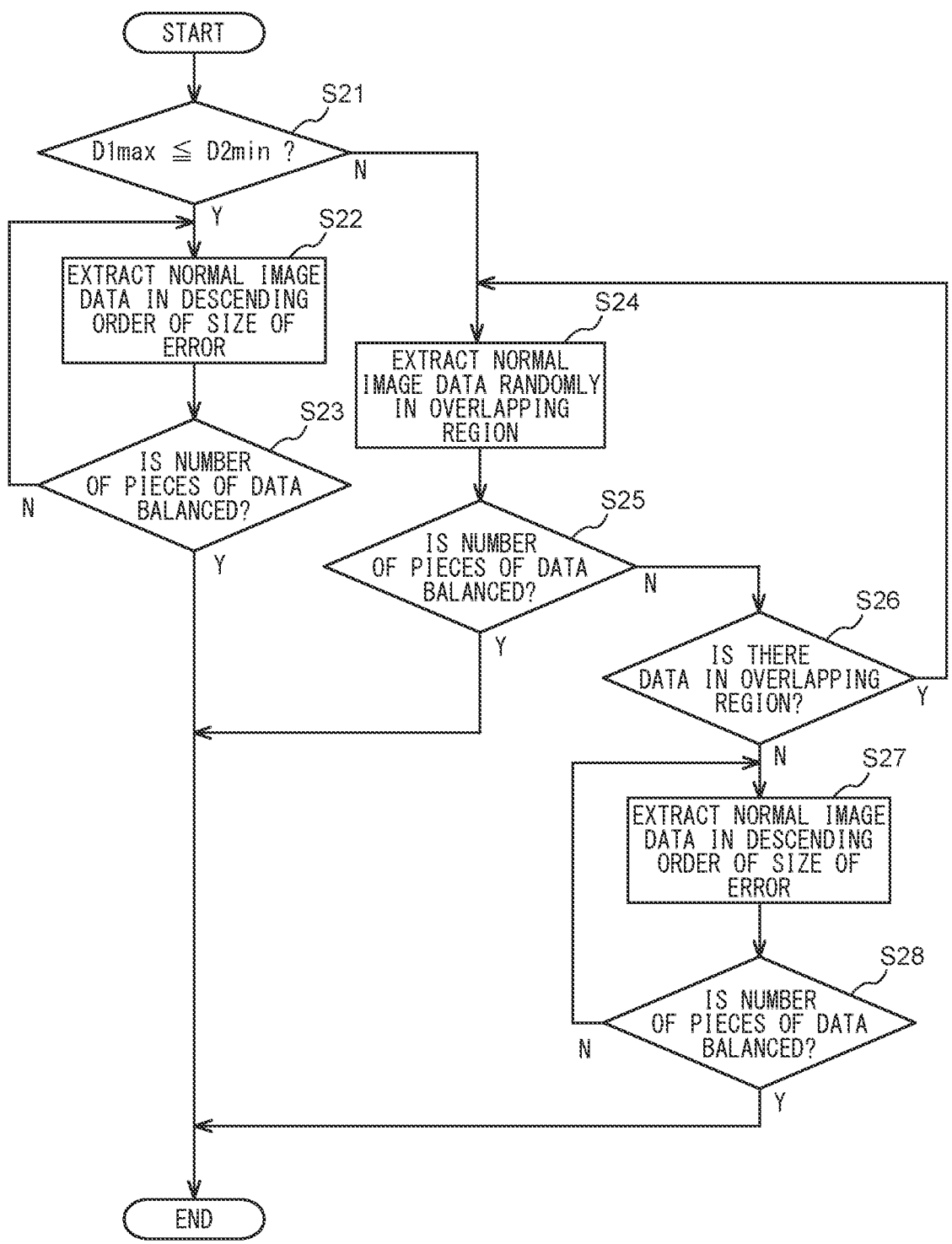
FIG. 7 is a flowchart of an extraction step according to the present embodiment.

FIG. 7 is a flowchart of the extraction step according to the present embodiment. Specifically, FIG. 7 illustrates the procedure of step S14 described above in detail. The processing illustrated in the flowchart of FIG. 7 is executed by the CPU of the control unit 11 while developing a program stored in the ROM of the storage unit 13 in the RAM or the like, for example.

In step S21, it is determined whether the maximum value (D1max) of the reconstruction error of the normal image data D1 is equal to or less than the minimum value (D2min) of the reconstruction error of the abnormal image data D2. Accordingly, it is possible to determine whether or not there is the above-described overlapping region. In the case of Yes in step S21, there is no overlapping region and the processing of step S22 is executed. On the other hand, in the case of No in step S21, the overlapping region exists and the processing in and after step S24 is executed.

In step S22, as described in the case 3 above, the normal image data D1 is extracted by counting the normal image data D1 in descending order of the size of the obtained reconstruction error. In step S22, the abnormal image data D2 is also extracted, but since NE, which is the total number of pieces of abnormal image data D2, are extracted in the present embodiment, any extraction procedure may be used. On the other hand, in a case where a part of the abnormal image data D2 is extracted, it is preferable to count the data in the ascending order of the size of the obtained reconstruction error among the abnormal image data D2.

In step S23, it is determined whether the number of pieces of normal image data D1 is balanced with the number of pieces of abnormal image data D2. In the present embodiment, it is determined whether the normal image data D1 has been obtained until the normal image data D1 is balanced with NE, which is the total number of pieces of abnormal image data D2. When it is determined in step S23 that the number of pieces of normal image data D1 and the number of pieces of abnormal image data D2 are balanced, the processing is ended (the extraction in the case 3 is completed). On the other hand, when it is not determined in step S23 that the number of pieces of normal image data D1 and the number of pieces of abnormal image data D2 are balanced, the processing returns to step S22.

In step S24, the normal image data D1 is randomly extracted in the overlapping region. By randomly extracting the normal image data D1, it is possible to extract the normal image data D1 without a bias.

In step S25, it is determined whether the number of pieces of normal image data D1 is balanced with the number of pieces of abnormal image data D2. In the present embodiment, it is determined whether the normal image data D1 has been obtained until the normal image data D1 is balanced with NE, which is the total number of pieces of abnormal image data D2. When it is determined in step S25 that the number of pieces of normal image data D1 and the number of pieces of abnormal image data D2 are balanced, the processing is ended (the extraction in the case 1 is completed). On the other hand, when it is not determined in step S25 that the number of pieces of normal image data D1 and the number of pieces of abnormal image data D2 are balanced, the processing of step S26 is executed.

In step S26, it is determined whether the normal image data D1 remains in the overlapping region. When the normal image data D1 remains in the overlapping region, the processing returns to step S24. On the other hand, when the normal image data D1 does not remain in the overlapping region, the processing of step S27 is executed.

In step S27, as described in the case 2 above, the normal image data D1 is extracted by counting the normal image data D1 in descending order of the size of the obtained reconstruction error. As a result, the normal image data D1 close to the overlapping region can be extracted.

In step S28, it is determined whether the number of pieces of normal image data D1 is balanced with the number of pieces of abnormal image data D2. In the present embodiment, it is determined whether the normal image data D1 has been obtained until the normal image data D1 is balanced with NE, which is the total number of pieces of abnormal image data D2. When it is determined in step S28 that the number of pieces of normal image data D1 and the number of pieces of abnormal image data D2 are balanced, the processing is ended (the extraction in the case 2 is completed). On the other hand, when it is not determined in step S28 that the number of pieces of normal image data D1 and the number of pieces of abnormal image data D2 are balanced, the processing returns to step S27.

As described above, according to the present embodiment, the input image data and the output image data of the autoencoder are considered, and the reconstruction error in the predetermined parameter between the input image data and the output image data is acquired. Then, data of each class is extracted such that the number of pieces of normal image data D1 counted in descending order of the size of the obtained error among the normal image data D1 and the number of pieces of abnormal image data D2 are balanced. Thus, balanced data based on the predetermined parameter is obtained from the imbalanced data. As a result, it is possible to generate a learning model capable of accurately identifying each class even in a case where data serving as a source of learning is imbalanced data.

According to the present embodiment, the overlapping region is generated when the maximum value (D1max) of the reconstruction error in the normal image data D1 is larger than the minimum value (D2min) of the reconstruction error in the abnormal image data D2. In this case, it is possible to extract and learn the normal image data D1 in the overlapping region without a bias by randomly extracting the normal image data D1 in the overlapping region. Thus, learning data effective for identification can be obtained.

According to the present embodiment, the number of pieces of data of the normal image class C1 and the number of pieces of data of the abnormal image class C2 can be reliably balanced by performing extraction such that the number of pieces of normal image data D1 is the same as the number of pieces of abnormal image data D2.

According to the present embodiment, it is possible to effectively grasp the feature of a minority class by extracting all NE pieces of abnormal image data D2 that is data of the minority class and effectively using the data for identification.

According to the present embodiment, it is possible to identify a normal product and an abnormal product by constructing the learning model using the normal image data D1 and the abnormal image data D2.

According to the present embodiment, it is possible to more accurately identify each class by setting a luminance value as the predetermined parameter, in a case where the normal image data D1 and the abnormal image data D2 are classified by the luminance.

According to the present embodiment, when the convolutional neural network is caused to learn the learning model obtained by the learning model generating method described above and the convolutional neural network is used in the identification unit 20C of the inspection device 1, the inspection device 1 can accurately identify whether the image data to be inspected belongs to the normal image class C1 or the abnormal image class C2.

The present invention is not limited to the embodiment described above but may be practiced in various aspects.

In the above-described embodiment, the normal image data D1 is randomly extracted when there is more normal image data D1 than the abnormal image data D2 in the overlapping range (case 1); however, the present invention is not limited to this, and the normal image data D1 may be extracted based on the maximum value D1max of the reconstruction error. For example, the normal image data D1 may be extracted in descending order of the size of the obtained reconstruction error even when there is an overlapping region.

In the above-described embodiment, NE, which is the total number of pieces of abnormal image data D2, are extracted when the abnormal image data D2 is extracted; however, the present invention is not limited thereto, and a part of the abnormal image data D2 may be extracted. The extraction method in this case is preferably based on the minimum value D2min of the reconstruction error, and the abnormal image data D2 may be extracted in ascending order of the size of the obtained reconstruction error, or may be extracted by other methods such as randomly extracting the data based on the minimum value D2min of the reconstruction error.

What is claimed is:

1. A learning model generating method for generating a learning model to be used for a convolutional neural network that determines which one of two classes, a first class and a second class having a smaller number of pieces of data than the number of pieces of data of the first class an inspection target belongs to, the learning model generating method comprising:

a first learning step of causing an autoencoder to learn using a plurality of pieces of first class data until first class data can be reconstructed an error acquisition step of inputting imbalanced data including the plurality of pieces of first class data and a plurality of pieces of second class data to the autoencoder as input image data, obtaining respective output image data, and acquiring an error in a predetermined parameter between the input image data and the output image data;

an extraction step of extracting the first class data and the second class data to obtain teacher data such that the number of pieces of the first class data counted in descending order of the size of the obtained error among the first class data and the number of pieces of the second class data are balanced; and a second learning step of causing the convolutional neural network to learn the teacher data to obtain a learning model.

2. The learning model generating method according to claim 1, wherein in the extraction step, the first class data is randomly extracted from between a maximum value of the error in the first class data and a minimum value of the error in the second class data in the predetermined parameter when the maximum value is larger than the minimum value.

3. The learning model generating method according to claim 1, wherein in the extraction step, extraction is performed such that the number of pieces of the first class data and the number of pieces of the second class data are the same.

4. The learning model generating method according to claim 1, wherein in the extraction step, the total number of pieces of the second class data are extracted.

5. The learning model generating method according to claim 1, wherein the first class data is normal image data, and the second class data is abnormal image data.

6. The learning model generating method according to claim 1, wherein the predetermined parameter is a luminance value.

7. An inspection device comprising:

an imaging unit that images an inspection target and generates image data;

an identification unit that has a convolutional neural network that determines which of two classes the image data belongs to; and an output unit that outputs a determination result by the identification unit, wherein the convolutional neural network is caused to learn by the learning model generating method according to claim 1.

* * * * *